(12) United States Patent
Kern

(10) Patent No.: US 12,570,532 B2
(45) Date of Patent: Mar. 10, 2026

(54) PROCESS AND PLANT FOR PREPARING NITRIC ACID

(71) Applicants: thyssenkrupp Industrial Solutions AG, Essen (DE); thyssenkrupp AG, Essen (DE)

(72) Inventor: Paul Kern, Dortmund (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 893 days.

(21) Appl. No.: 17/791,881

(22) PCT Filed: Dec. 21, 2020

(86) PCT No.: PCT/EP2020/087544
§ 371 (c)(1),
(2) Date: Jul. 8, 2022

(87) PCT Pub. No.: WO2021/140023
PCT Pub. Date: Jul. 15, 2021

(65) Prior Publication Data
US 2023/0038954 A1 Feb. 9, 2023

(30) Foreign Application Priority Data

Jan. 10, 2020 (DE) ..................... 10 2020 200 235.5

(51) Int. Cl.
*C01B 21/28* (2006.01)
*B01J 12/00* (2006.01)
(Continued)

(52) U.S. Cl.
CPC ............. *C01B 21/28* (2013.01); *B01J 12/005* (2013.01); *B01J 19/0046* (2013.01); *C01B 21/38* (2013.01); *B01J 2219/00002* (2013.01)

(58) Field of Classification Search
CPC ......... C01B 21/28; C01B 21/38; C01B 21/26; B01J 12/005; B01J 19/0046; B01J 2219/00002
See application file for complete search history.

(56) References Cited

U.S. PATENT DOCUMENTS

| | | |
|---|---|---|
| 3,506,396 A | 4/1970 | Dijk et al. |
| 3,868,443 A | 2/1975 | Scheibler et al. |
| 2019/0218097 A1* | 7/2019 | Postma .............. B01D 53/8631 |

FOREIGN PATENT DOCUMENTS

| | | |
|---|---|---|
| CN | 108946687 A1 | 12/2018 |
| DE | 10 2005 023 161 A1 | 11/2006 |

(Continued)

OTHER PUBLICATIONS

Kern, Dr. Paul, Nitric Acid Plant Revamp Concepts, 6th thyssenkrupp Fertilizer Symposium 2018, 18 pages (2018).

(Continued)

*Primary Examiner* — Sally A Merkling
*Assistant Examiner* — Logan Laclair
(74) *Attorney, Agent, or Firm* — thyssenkrupp North America, LLC

(57) ABSTRACT

A process for producing nitric acid by the Ostwald process involves reacting ammonia with atmospheric oxygen as primary air to afford a NOx-containing gas stream in an ammonia oxidation reactor at a first pressure and absorbing the NOx-containing gas stream in water in an absorption apparatus at a higher, second pressure. Nitric acid is bleached with bleach air as secondary air at approximately the first pressure. The secondary air is brought to an operating pressure of the bleaching operation via a separate secondary air compressor or compressor stage. The separate secondary air compressor is independent of the compressor that brings the primary air to the first pressure. Compression to the second higher pressure at which the absorption of the (Continued)

NOx gases is performed in the absorption apparatus is provided only downstream of the bleaching operation.

21 Claims, 2 Drawing Sheets

(51) Int. Cl.
   *B01J 19/00*      (2006.01)
   *C01B 21/38*      (2006.01)

(56)                References Cited

FOREIGN PATENT DOCUMENTS

| | | | |
|---|---|---|---|
| EP | 3 372 556 A1 | 9/2018 | |
| WO | 01/68520 A1 | 9/2001 | |
| WO | WO-2018162150 A1 * | 9/2018 | ............. C01B 21/46 |

OTHER PUBLICATIONS

English Translation of International Search Report issued in PCT/EP2020/087544, dated Apr. 15, 2021.
Jean-Francois Granger, "Boosting nitric acid plant capacity", Nitrogen & Syngas 349, pp. 46-47, 2017.

* cited by examiner

PROCESS AND PLANT FOR PREPARING NITRIC ACID

CROSS REFERENCE TO RELATED APPLICATIONS

This application is a U.S. National Stage Entry of International Patent Application Serial Number PCT/EP2020/087544, filed Dec. 21, 2020, which claims priority to German Patent Application No. DE 10 2020 200 235.5, filed Jan. 10, 2020, the entire contents of both of which are incorporated herein by reference.

FIELD

The present disclosure generally relates to plants and processes for preparing nitric acid, including a process for producing nitric acid by the Ostwald process that involves the reaction of ammonia with atmospheric oxygen.

BACKGROUND

WO 2018/162150 A1 discloses a process and plant for producing nitric acid wherein the oxidation of ammonia to nitrogen oxides (NOx) is carried out in a reactor at a first pressure, said oxides subsequently being reacted with water to afford crude nitric acid in an absorption tower, wherein the absorption tower is operated at a higher pressure than the reactor and a NOx compressor increases the pressure of the gases exiting the reactor to the higher absorption pressure. Plants of this type are therefore also referred to as dual-pressure plants.

WO 2018/162150 A1 describes two different concepts for plants for production of nitric acid. In the first concept, air is brought to the reaction pressure using an air compressor, wherein the compressed air stream is divided and a first sub-stream is used for bleaching the nitric acid in a bleaching tower while the second sub-stream of the air is supplied to the ammonia oxidation reactor. The bleaching operation is thus carried out here at the lower pressure, and therefore at the same pressure of the oxidation of the ammonia. The plant comprises an air compressor, a NOx compressor, and a residual gas turbine which are all arranged on one shaft. What is described here is a conventional production plant according to the dual-pressure process (prior art).

In conventional nitric acid plants according to the dual-pressure process which operate with only one air compressor responsible both for generating the primary air for the ammonia oxidation and for generating the secondary air for the bleaching operation, so that the air stream is divided downstream of the air compressor, the output of the compressor is often a bottleneck which limits the capacity of such a dual pressure plant. However, if a supplementary additional secondary air compressor for the bleach air is used the possibility of increasing the capacity of the plant is severely limited by the capacity of the NOx compressor since the output stream of the low-pressure bleaching (for recovery of NOx) must be fed back in between the air compressor and the NOx compressor of the main machine. The air compressor and the NOx compressor are generally matched to each other. A revamp would therefore require the entire compressor assembly, including the main air compressor and the NOx compressor, to be adapted, which is generally expensive. In addition, operators of these plants regard modifications in the region of the compressor assembly (so-called main machine), on the shaft of which the steam turbine and the residual gas turbine are generally also arranged, as risky.

FIG. 2 of WO 2018/162150 A1 proposes an alternative concept, which provides an additional compressor for bleach air by means of which a separately introduced air stream is compressed to a higher pressure, namely the second pressure at which the absorption tower operates. The nitric acid is initially bleached at the higher pressure in a first bleaching tower, downstream of which is arranged a second bleaching tower operated at a lower pressure, wherein a valve is arranged between the two bleaching towers to decompress the product gas stream to the lower first pressure. The second bleaching tower is supplied with bleach air, which is compressed by a first air compressor which also provides the air for the ammonia oxidation reactor and is diverted from this primary air in a sub-stream. In this case, there are altogether three compressors present, namely the NOx compressor, the primary air compressor, and the second air compressor for the bleach air which compresses to a higher pressure level and is not arranged on the same shaft as the two other compressors. While this concept does have the advantage that the operating point of the main air compressor for the primary air is hardly altered, the costs for the additional secondary air compressor (for the bleach air) are comparatively high because this compressor operates at a higher pressure and the overall bleaching system of the plant requires replacement. A revamp of the plant is complex, since this requires the use of new acid pumps and alteration of the product conduits. In addition, purification of the crude nitric acid, i.e. bleaching, at a higher pressure is more difficult and less effective.

It is therefore a substantial disadvantage of the described process that, for this reason, it is not possible to provide the entire capacity of the main machine for oxidation of ammonia/for production of nitric acid; instead, a significant proportion of the air must still be passed to the low-pressure bleaching tower.

Also known from the prior art are so-called single-pressure processes for producing nitric acid in which two air compressors are arranged in series and produce both the primary air for the ammonia oxidation and the secondary air for the bleaching process, wherein the air stream is divided into bleach air and primary air downstream of the second air compressor. For example, CN 108946687 A describes such a single-pressure process in which the absorption of the NOx gases in the absorption tower is carried out at the same pressure as the ammonia oxidation, so that there is no NOx compressor downstream of the ammonia oxidation reactor. However, such a plant allows only production of dilute nitric acid.

Thus a need exists for an improved dual-pressure process for producing nitric acid having the features recited above, wherein the limitations in terms of the capacity of the plant determined by the compressors are overcome and an increase in the capacity of the plant is made possible with reduced capital costs.

DETAILED DESCRIPTION

Figure 1:
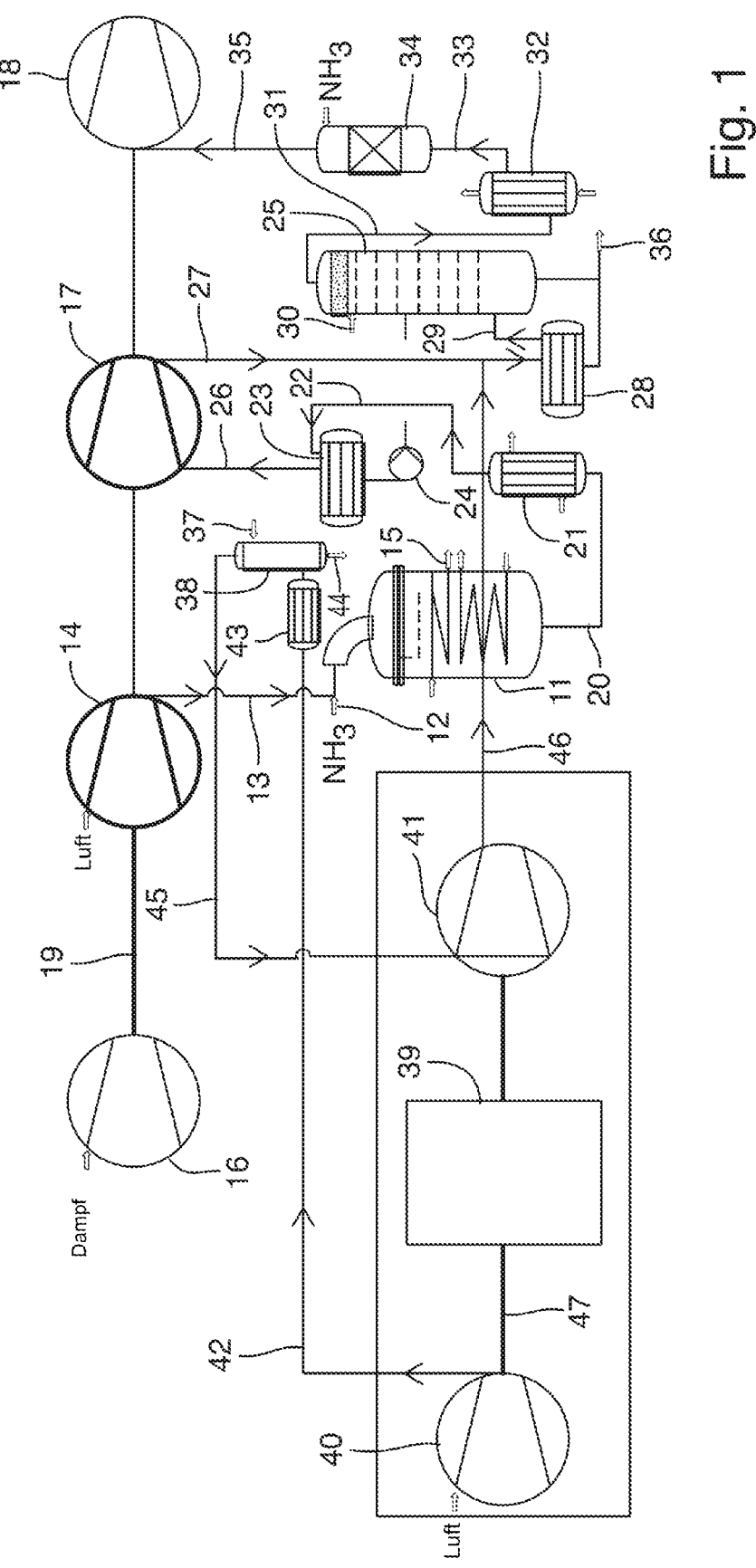
FIG. 1 is a schematic view of a simplified plant scheme of an exemplary inventive plant for producing nitric acid by a dual-pressure process.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a process for producing nitric acid by the Ostwald process comprising reaction of ammonia with atmospheric oxygen (primary air) to afford a NOx-containing gas stream in an ammonia oxidation reactor at a first pressure and absorption of the NOx-containing gas stream in water in an absorption apparatus at a second pressure, which is higher than the first pressure. In some examples, the process comprises a step that provides for bleaching of the nitric acid with bleach air (secondary air). The bleaching may be performed approximately at the pressure level of the first pressure.

According to the invention, the secondary air is brought to the operating pressure of the bleaching operation via at least one separate compressor, wherein this separate compressor is independent of the compressor which brings the primary air to the first pressure of the ammonia oxidation reaction.

In a departure from the process known from WO 2018/162150 A1 the bleaching is effected according to the invention using a second secondary air compressor which is independent of the primary air compressor (main air compressor) but which compresses the secondary air for the bleaching operation only to the first lower pressure at which the ammonia oxidation reactor also operates. A compression to the second higher pressure at which the absorption of the NOx gases is carried out in the absorption apparatus is thus provided only downstream of the bleaching operation in the process according to the invention. In this process concept, there is no stress on the NOx compressor of the main machine, which may still be arranged on the shaft of the primary air compressor.

In the concept according to the invention, the secondary air system of the plant does not need to be replaced but may continue to be utilized as before because the bleaching operation is carried out not at the elevated pressure but rather at the first lower pressure. No new acid pumps need be used and the product conduits need not be altered. In the process according to the invention, the existing secondary air system may assume the function of an intermediate cooling. In the case of a revamp of an existing nitric acid plant to increase the capacity thereof, the concept according to the invention avoids alterations to the main machine (i.e. the plant region comprising the compressors and turbines). There is no stress on the NOx compressor of the main machine.

Some of the terms used herein shall be further elucidated once again below for better understanding of the present description of the invention.

"Primary air" is to be understood as meaning the air supplied to the ammonia oxidation reactor in order therein to oxidize the ammonia likewise supplied thereto to nitrogen oxides.

The term "nitrogen oxides" is used for the oxides of the various oxidation states formed in the oxidation reaction of ammonia, namely nitrogen monoxide (NO), nitrogen dioxide ($NO_2$), dinitrogen tetroxide ($N_2O_4$) and dinitrogen monoxide ($N_2O$), although the reaction forms primarily NO and $NO_2$. These various nitrogen oxides are also collectively referred to as NOx.

The air used for the bleaching operation of the crude nitric acid is referred to as bleach air or else as "secondary air".

A "dual-pressure process" is to be understood as meaning a process for producing nitric acid in which the ammonia oxidation reaction is performed at a lower pressure than the absorption of the nitrogen oxides in water to produce nitric acid. The latter is carried out in an absorption apparatus, generally an absorption tower. The lower pressure of the ammonia oxidation is also referred to herein as the "first" pressure while the higher pressure of the absorption is also referred to as the "second" pressure.

The term "residual gas" refers to the gas which is not converted into liquid nitric acid in the absorption but rather exits the absorption tower in gaseous form. This residual gas is in the residual gas purification generally reduced to nitrogen by reaction with ammonia to reduce the content of nitrogen oxides (NOx) in the residual gas. This residual gas is also referred to as "tail gas" in the Anglosphere.

The "NOx compressor" is the compressor which is used in a dual-pressure process to compress the NOx gas formed in the oxidation reaction to the higher second pressure.

The "machine" or main machine is to be understood as meaning the plant region comprising the compressors and turbines coupled to one another and arranged on a single shaft, generally a steam turbine, the primary air compressor or main air compressor, the NOx compressor and a residual gas turbine in which the residual gas is decompressed to a lower pressure after purification.

The present invention shall especially provide a process according to the dual-pressure principle which, for provision of bleach air, utilizes a secondary air compressor independent of the main machine, wherein (a) the operating point of the main set is influenced only to a very small extent, if at all, and therefore especially secondary air is not introduced between the air compressor and the NOx compressor of the main machine at the pressure level of the ammonia oxidation, (b) the bleaching of the acid may be carried out at the pressure level of the ammonia oxidation or even therebelow and (c) the full capacity of the air compressor of the main machine may be provided for the ammonia oxidation.

According to the invention, downstream of the bleaching operation, the gas mixture formed in the bleaching operation is, by means of a further air compressor or a further air compressor stage, brought to the second pressure at which the absorption of the NOx-containing gas stream in water is carried out, wherein this further air compressor or the air compressor stage operates independently of a NOx compressor which compresses the product gas mixture of the ammonia oxidation reactor to the second pressure. In the bleaching operation, the crude nitric acid is stripped using the bleach air, the resulting bleach air laden with NOx gases exits the bleaching apparatus and in this variant of the invention this laden bleach air is subsequently brought to the elevated second pressure using the further air compressor (bleach air compressor). By contrast, in the prior art according to WO 2018/162150 A1 cited at the outset, a bleaching operation at elevated pressure is followed by recycling of the bleach air downstream of the NOx compressor without further compression into the high-pressure range since the bleaching operation is already carried out at the elevated pressure.

In a preferred development of the process according to the invention the output stream of a low-pressure bleaching apparatus, which is brought to the second pressure in a further bleach air compressor or a further bleach air compressor stage, at the entrance to the further bleach air compressor or a further bleach air compressor stage comprises a residual content of NOx (NO+NO$_2$) of 0-5000, preferably 0-100 and particularly preferably 0-30 ppmv.

In a further development of the process according to the invention, the output stream of a low-pressure bleaching apparatus, in particular of a bleaching tower operated at the first pressure which (the output stream) is brought to the second pressure in a further bleach air compressor or a further bleach air compressor stage is provided with a monitoring means therein for the residual content of NOx (NO+NO$_2$) and/or of water and/or for parameters dependent on these contents (such as for example dew points).

In a preferred development of the process according to the invention the acid feed stream to a low-pressure bleaching apparatus, in particular to a bleaching tower, is provided with suitable measures therein for adhering to a preferred residual content of NOx (NO+NO$_2$).

In a preferred development of the process according to the invention the measure for adhering to the preferred residual content of NOx (NO+NO$_2$) at the entrance to the further bleach air compressor or a further bleach air compressor stage consists of providing an upstream bleaching tower which is operated at a pressure level of the absorption apparatus and is supplied on the gas side with the output stream of the further bleach air compressor or a further bleach air compressor stage.

In a preferred development of the process according to the invention the output stream of the low-pressure bleaching apparatus is provided with suitable measures therein for adhering to the preferred residual content of NOx (NO+NO$_2$) at the entrance to the further bleach air compressor or a further bleach air compressor stage.

In a preferred development of the process according to the invention the measure in the output stream of the low-pressure bleaching apparatus for adhering to the preferred residual content of NOx (NO+NO$_2$) at the entrance to the further bleach air compressor or a further bleach air compressor stage consists of providing a catalytic measure for reduction of the NOx content, in particular a selective catalytic reduction of NOx with ammonia.

In a preferred development of the process according to the invention the measure in the output stream of the low-pressure bleaching apparatus for adhering to the preferred residual content of NOx (NO+NO$_2$) at the entrance to the further bleach air compressor or a further bleach air compressor stage consists of providing a dilution of the output stream of the low pressure bleaching apparatus with additional air which is preferably provided from the first bleach air compressor or from the first bleach air compressor stage.

In a preferred development of the process according to the invention the further bleach air compressor or the bleach air compressor stage are operatively connected to the secondary air compressor or the secondary air compressor stage. In other words either two separate compressors or two separate compressor stages of a single compressor are preferably coupled to one another for drive purposes here, wherein the first compressor which is referred to herein as a secondary air compressor, or the first compressor stage which initially brings secondary air supplied in a separate conduit tract to the first pressure required for the bleaching operation of the crude nitric acid and wherein subsequently the second compressor, which to distinguish it from the secondary air compressor is referred to as a bleach air compressor or further bleach air compressor, is used for bringing the laden secondary air to an elevated second pressure, at which the absorption of nitric acid is also carried out, after the bleaching operation.

In a preferred development of the process according to the invention, the further bleach air compressor or the bleach air compressor stage is coupled to the secondary air compressor or the secondary air compressor stage via transmission means.

In a preferred development of the process according to the invention, the secondary air brought to the first pressure by means of the separate secondary air compressor or the separate secondary air compressor stage is supplied to a bleaching apparatus operating at the first pressure via a separate conduit. The prior art does already disclose plants where a separate secondary air compressor arranged in a separate conduit tract is provided in addition to the primary air compressor. However, in these known processes, after the bleaching operation the laden secondary air is then passed into a region upstream of the NOX compressor so that said compressor must additionally also bring the laden bleach air to the elevated second pressure before said air may be recycled into the absorption process. Accordingly, in this known solution the NOx compressor is not relieved by the separate secondary air compressor.

In a preferred development of the process according to the invention, the gas mixture of NOx-laden bleach air exiting the bleaching apparatus is supplied to the further bleach air compressor or the bleach air compressor stage via a conduit. According to the invention, this further bleach air compressor then assumes the task of compressing the pressure of the laden bleach air to the second pressure, so that this laden bleach air now at elevated pressure may be recycled into the absorption process, while circumventing the NOx compressor.

In a preferred development of the process according to the invention, the gas mixture brought to the second pressure exiting the bleach air compressor or the bleach air compressor stage is thus preferably passed into a region downstream of the NOx compressor via a conduit and is subsequently supplied to the absorption apparatus.

The process according to the invention has the advantage that a first secondary air compressor or a first stage/an intermediate state of a multistage secondary air compressor may be connected to an existing bleach air system of a plant. In the process according to the invention the bleaching is carried out at the first lower pressure of for example 2 bar to 6 bar and thus at the original pressure level. The laden bleach air may be passed into the second/downstream compressor stage or into the second compressor (the further bleach air compressor according to the terminology used herein), brought therein to the elevated second pressure of for example 9 bar to 16 bar and then recycled into the process for producing nitric acid (in the absorption apparatus).

The secondary air system may assume the function of an intermediate cooling. The cooling of the output air of the bleaching process which is brought to an elevated pressure in the downstream further bleach air compressor may be carried out for example in a high-pressure acid condenser.

The present invention further provides a plant for producing nitric acid, in particular by a process of the above-described type, comprising a primary air compressor, at least one secondary air compressor arranged in a conduit tract separate from the primary air compressor, a NOx compressor arranged on the same shaft as the primary air compressor, an ammonia oxidation reactor, an absorption apparatus and a bleaching apparatus, wherein according to the invention at least one further compressor, namely a bleach air compressor or at least one further bleach air compressor stage, by means of which a laden gas stream from the bleaching apparatus is brought to the second pressure at which the absorption of the NOx-containing gas stream in water is carried out, is arranged downstream of the secondary air compressor.

In a preferred development of the invention in the plant according to the invention the exit of the secondary air compressor is connected via at least one conduit to a bleaching apparatus which is operated at about the same pressure as the reaction in the ammonia oxidation reactor and at least one conduit connects the exit of the bleaching apparatus to the entrance of the further bleach air compressor or the further bleach air compressor stage, wherein the further bleach air compressor/the further bleach air compressor stage is distinct from the NOx compressor. In other words, the abovementioned bleach air compressor is not the NOx compressor. In this variant the plant thus comprises at least four compressors, the primary air compressor, the NOx compressor, the second air compressor and the further bleach air compressor which is arranged downstream of the secondary air compressor, to subsequently bring the laden bleach air exiting the bleach apparatus to a higher pressure which corresponds approximately to the pressure at which the absorption of the NOx gases in the absorption apparatus is carried out. However, the secondary air compressor may be configured either as two separate compressors or else as two compressor stages of the same compressor comprising two or more compressor stages. In the latter case, there would only be three compressors in total but at least four compressor stages in total.

In a preferred development of the invention, a conduit proceeding from the high-pressure side of the further bleach air compressor or the further bleach air compressor stage is provided which opens into a conduit in the high-pressure region downstream of the NOx compressor. This conduit can then be used to recycle the NOx-laden bleach air into the absorption process in the absorption apparatus. Since the further bleach air compressor assumes the function of compression of this gas stream this does not stress the NOx compressor and said compressor therefore need not be replaced in a revamp for increasing the capacity of the plant.

A possible alternative construction variant of the invention provides that the secondary air compressor and the further bleach air compressor are configured as two separate compressors coupled to one another via transmission means. This coupling makes it possible for example to operate a compressor assembly where the two compressors are driven via one drive shaft.

A second alternative construction variant of the invention provides that the secondary air compressor is in the form of a first compressor stage of a compressor having at least two compressor stages and the further bleach air compressor stage is in the form of a second compressor stage of the same compressor, wherein the two compressor stages are coupled to one another via transmission means.

In a preferred development of the present invention, the secondary air compressor and the further bleach air compressor or the secondary air compressor stage and the further bleach air compressor stage are in the form of transmission turbo compressors, wherein the respective compressor shafts of the compressors or of the compressor stages are coupled to one another via transmission means. It has been found that this machine concept for the secondary air compressor is substantially more advantageous than for example processes where two bleaching apparatuses are employed, of which a first bleaching apparatus in the flow pathway is operated at high pressure, since in that case the single secondary air compressor must bring the secondary air (bleach air) to the second higher pressure at which the absorption of the NOx gases is carried out and since the bleaching operation performed at higher pressure also entails disadvantages.

In a preferred development of the invention the primary air compressor and the NOx compressor are arranged on the same drive shaft while the secondary air compressor or the secondary air compressor stage and the further bleach air compressor or the further bleach air compressor stage are arranged in a drive train separate from the drive shaft. The existing region of the so-called main machine in which the primary air compressor and the NOx compressor and usually also the residual gas turbine and optionally a steam turbine are arranged on the same drive shaft therefore need not be altered in a revamp of the plant. In fact, the secondary air compressor, which initially brings the secondary air to the (lower first) pressure necessary for the bleaching operation, is in a drive train separate from the main machine. The laden bleach air formed by the stripping of the crude nitric acid with air in the bleaching operation is passed to the further bleach air compressor which then brings it to the higher second pressure which corresponds to the pressure in the absorption of the NOx gases in water, so that this gas stream need not be compressed by the NOx compressor.

In a preferred development of the invention, the plant comprises a high-pressure acid condenser which is arranged downstream of the further bleach air compressor or the further bleach air compressor stage. In this case, "high-pressure" is to be understood as meaning that this acid condenser operates at the elevated second pressure, in particular in the abovementioned pressure range. In the case of a revamp of a dual-pressure plant this may be a high-pressure acid condenser which is already in the high-pressure region, i.e. downstream of the NOx compressor, and upstream of which the conduit from the further bleach air compressor opens, so that here too no remodelling of this plant region is necessary; instead, the high-pressure acid condenser may be utilized.

The following refers initially to FIG. 1, and a first exemplary variant of the process according to the invention is more particularly elucidated with reference thereto. The representation of FIG. 1 is a much-simplified schematic diagram and only the plant components that are relevant in the context of the present invention are shown.

The inventive plant comprises an ammonia oxidation reactor 11 to which ammonia is supplied via a conduit 12 (see arrow 12). In this ammonia oxidation reactor 11, ammonia is catalytically oxidized to nitrogen oxides (NOx) using atmospheric oxygen.

The supply of air for this oxidation reaction (so-called primary air) is effected via conduit 13, wherein the primary air is brought using the air compressor 14 to a first pressure (for example 2 to 6 bar) at which the reaction in the ammonia oxidation reactor is carried out. The oxidation of the ammonia is carried out catalytically at high temperatures of for example about 900° C., wherein the ammonia is initially oxidized to nitrogen monoxide (NO) and then, after temperature reduction, to nitrogen dioxide ($NO_2$). The high temperature in the ammonia oxidation reactor 11 is utilized for producing steam, wherein the steam 15 produced is supplied to a steam turbine 16, by means of which at least a portion of the propulsion energy for the compressors used in the plant is obtained. To this end, the steam turbine 16, a first air compressor 14, a NOx compressor 17 and a residual gas turbine 18 are arranged on the same shaft 19.

The NOx-containing product gas produced in the ammonia oxidation reactor 11 exits the reactor via the conduit 20 and is initially supplied to one or more heat exchangers 21 for heat recovery and subsequently supplied via conduit 22 to an intermediate-pressure acid condenser 23 in which a cooling is effected, thus condensing water present in the product gas stream to form, together with the NOx gas, a first proportion of acid condensate which may be supplied using pump 24 to the absorption tower 25 (the relevant connecting conduit is not shown here). The NOx-containing gas stream flows from the acid condenser 23 via conduit 26 to the NOx compressor 17 and is compressed therein to a higher pressure (for example to about 9 to 16 bar) since this is a dual-pressure process and is subsequently supplied via conduit 27 to a high-pressure acid condenser 28, in which a portion of acid condensate is likewise obtained, and the product mixture then passes through conduit 29 into the absorption tower 25 in which the NOx gas is absorbed in water and nitric acid ($HNO_3$) is produced. The process water required for the reaction may be supplied to the absorption tower 25 via a conduit indicated by arrow 30.

The residual gas (so-called tail gas) exits at the top of the absorption tower 25 via conduit 31, is passed through a residual gas heater 32 and then supplied via conduit 33 to a residual gas reactor 34 which is also supplied with ammonia which reacts with the nitrogen oxides remaining in the residual gas to afford nitrogen and water, so that the residual gas is freed of NOx and purified. The residual gas is then supplied to the residual gas turbine 18 via conduit 35 and decompressed therein. This drives the residual gas turbine 18 and, since it is on the same shaft 19 as the two compressors 14 and 17, the residual gas turbine 18 likewise provides a proportion of the propulsion energy for the two compressors 14, 17. The decompressed residual gas may be discharged via a chimney for example.

The nitric acid produced in the absorption tower 25 is discharged via the arrow 36 (the representation of FIG. 1 is a simplified plant scheme which does not show all plant parts and conduits) and is then supplied, as indicated by the further arrow 37, to a bleaching tower 38 in which the nitric acid is purified by stripping the NOx gases present in the product mixture using air. This is done using the so-called secondary air which in conventional dual-pressure processes for producing nitric acid is provided by the same compressor as the primary air for oxidation of the ammonia to NOx. However, the process according to the invention employs an assembly of at least two compressors 40, 41 or a two-stage or multi-stage compressor, in particular a transmission turbo compressor as indicated in the exemplary embodiment. This transmission turbo compressor comprises a first compressor 40 (also referred to herein as secondary air compressor) or a first compressor stage to which air is supplied, wherein the air compressed to an elevated pressure is supplied via the conduit 42 to the bleaching tower 38, so that, similarly to a conventional dual-pressure plant, the bleaching operation is carried out at a first lower pressure which is approximately of the same order of magnitude as the pressure in the ammonia oxidation reactor 11. The bleaching tower 38 may also have a cooler 43 arranged upstream of it. The purified nitric acid is discharged in the lower region from the bleaching tower 38 via the conduit 44 (see arrow).

After the bleaching operation in the bleaching tower 38 the gas stream in the upper region is discharged from the bleaching tower via the conduit 45 and then supplied to the second compressor 41 (also referred to herein as further bleach air compressor) or the second compressor stage and via this second compressor 41 compressed to a higher pressure, so that the compressed gas stream can flow via the conduit 46 downstream of the second compressor 41 into the high-pressure region of the plant where the conduit 46 opens into the conduit 27 in which the NOx gases compressed by the NOx compressor 17 flow, so that the gas stream from the conduit 46 may be supplied to the high-pressure acid condenser 28 together with the NOx gas stream from conduit 27 and is recycled into the nitric acid production.

It is a particular feature of the plant according to the invention that the two compressors 40, 41, i.e. the first compressor 40 which compresses the secondary air to a first pressure and the second compressor which compresses the gas stream from the bleaching tower 38 to a second pressure higher than the first pressure, are effectively mechanically coupled to one another via a transmission 39. Transmission turbo compressors are known in principle from the prior art and are described for example in EP 3 106 670 A1. Transmission turbo compressors generally comprise a drive shaft and at least two compressor shafts of the respective compressor, wherein the compressor shafts are each coupled to the drive shaft via transmission means and therefore also coupled to one another. The drive shaft and the compressor shafts may each be arranged parallel to one another or else perpendicular to one another when using bevel gears as described for example in the abovementioned European patent specification. FIG. 1 shows merely a schematic of the transmission turbo compressor used according to the invention with the two compressors 40, 41, wherein the coupling is indicated via a shaft 47 and the transmission 39 is illustrated by a rectangular box.

Figure 2:
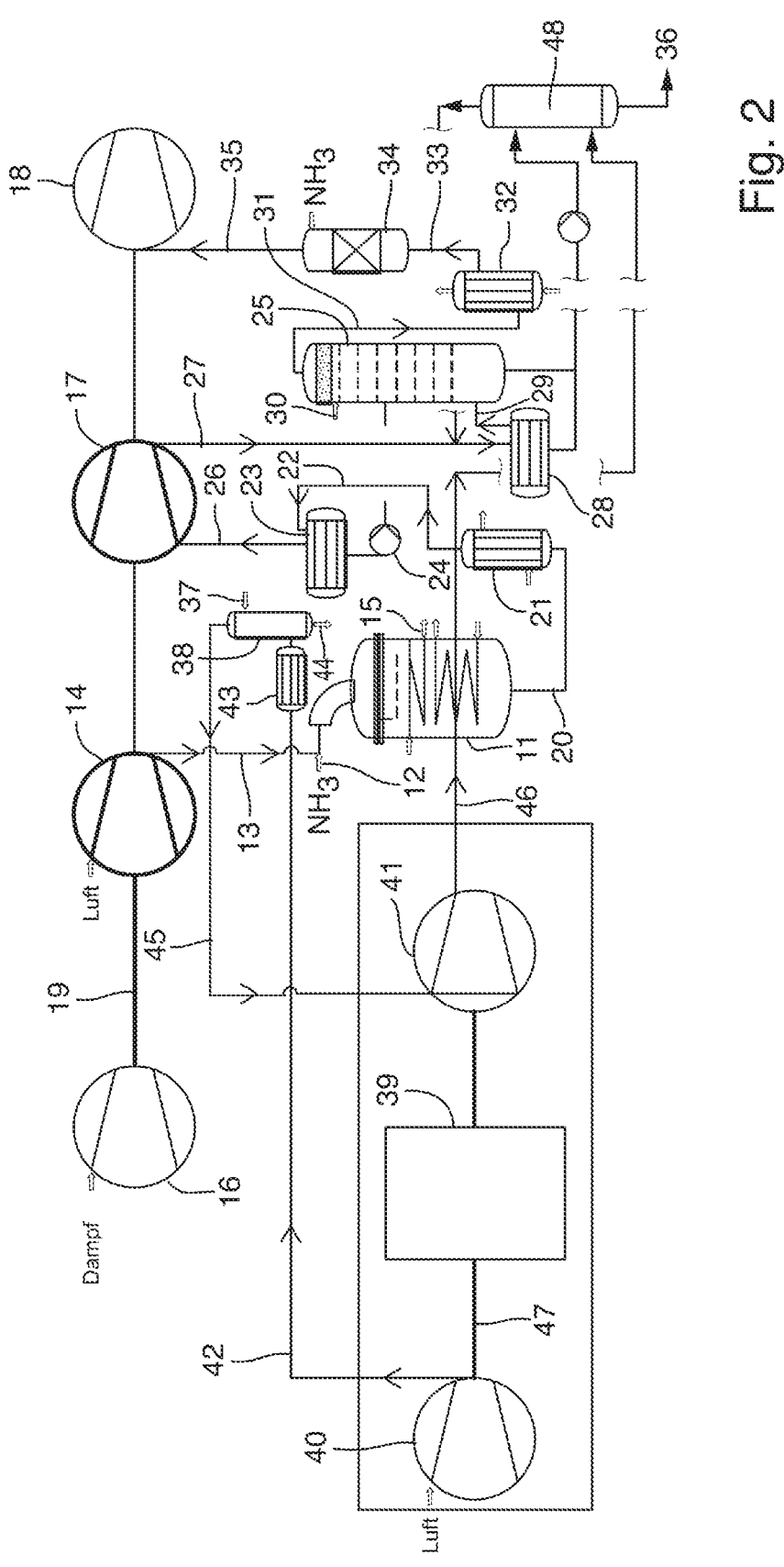
FIG. 2 is a schematic view of a simplified plant scheme of another exemplary inventive plant for producing nitric acid by a dual-pressure process.

An exemplary alternative variant of the present invention is more particularly elucidated hereinbelow with reference to FIG. 2. In the variant according to FIG. 2, the plant for producing nitric acid by the dual-pressure process is in large parts configured in a similar fashion as in the variant according to FIG. 1, and reference is therefore made to the preceding description in this respect. Therefore, only the regions of the plant which are divergent are more particularly elucidated hereinbelow. These divergences are essentially in the lower right-hand region of the drawing. In a departure from the variant of FIG. 1 the NOx-laden gas stream from the bleach air compressor 41 compressed in the second bleach air compressor 14, via conduit 46, is not passed directly into the high-pressure region downstream of the NOx compressor 17 and upstream of the high-pressure acid condenser 28 but rather is initially supplied to an upstream bleaching tower 48 where this gas stream bleaches the acid stream from the absorption tower 25 (by stripping), wherein the gas stream then exits from the top of the upstream bleaching tower 48 and is passed from there into the high-pressure region where it is admixed with the NOx gas stream in conduit 27. The acid from the absorption tower 25 and from the high-pressure acid condenser 28 enters the upstream bleaching tower 48 in countercurrent to the gas stream and the prepurified acid exits the lower region of the bleaching tower 48 and is then passed via the conduit 36 (see arrow) to the bleaching tower 38 in the low-pressure region which is also referred to herein as the low-pressure bleaching apparatus. This makes it possible to adhere to a preferred residual content of NOx ($NO+NO_2$) at the entrance to the further bleach air compressor 41 or a further bleach air compressor stage since effectively two bleaching measures are arranged in series.

Another alternative variant of the process, which is not shown in the figures, provides that for adhering to the preferred residual content of NOx (NO+NO$_2$) at the entrance to the further bleach air compressor 41 or the further bleach air compressor stage the output stream of the low-pressure bleaching apparatus is provided with a catalytic measure therein for reduction of the NOx content, which especially consists of a selective catalytic reduction of NOx with NH$_3$. To this end, ammonia may for example be diverted from the conduit 12 shown in FIG. 1 and introduced into the conduit 45 downstream of the bleaching tower to reduce the NOx content in the laden bleach air by reaction with ammonia and thus protect the bleach air compressor 41.

In a further alternative variant of the process according to the invention, which is likewise not shown in the figures, a measure envisaged for adhering to the preferred residual content of NOx (NO+NO$_2$) in the output stream from the low-pressure bleaching apparatus at the entrance to the further bleach air compressor or the further bleach air compressor stage is a dilution of the output stream from the low-pressure bleaching apparatus with additional air which may be provided for example by the first bleach air compressor 40 or the first bleach air compressor stage. To this end air may be diverted for example from the conduit 42 downstream of the bleach air compressor 40 via a branch conduit which is preferably closable via a valve and which then opens into the conduit 45 downstream of the bleaching tower 48. Alternatively, this branch conduit could also open out between the cooler 43 and the bleaching tower 38 and supply additional air there.

LIST OF REFERENCE NUMERALS

11 Ammonia oxidation reactor
12 Conduit for ammonia
13 Conduit for primary air
14 Air compressor
15 Steam
16 Steam turbine
17 NOx compressor
18 Residual gas turbine
19 Shaft
20 Conduit for NOx-containing product gas
21 Heat exchanger
22 Conduit
23 Intermediate-pressure acid condenser
24 Pump
25 Absorption tower, absorption apparatus
26 Conduit
27 Conduit
28 High-pressure acid condenser
29 Conduit
30 Arrow, supply of process water
31 Conduit for residual gas
32 Residual gas heater
33 Conduit
34 Residual gas reactor
35 Conduit
36 Arrow
37 Arrow
38 Bleaching tower/low-pressure bleaching apparatus
39 Transmission
40 Secondary air compressor or compressor stage
41 Bleach air compressor or compressor stage

42 Conduit for secondary air (bleach air)
43 Cooler
44 Conduit for nitric acid
45 Conduit
46 Conduit
47 Shaft
48 Upstream bleaching tower

What is claimed is:

1. A process for producing nitric acid by the Ostwald process, comprising:

reacting ammonia with atmospheric oxygen as primary air to afford a NOx-containing gas stream in an ammonia oxidation reactor at a first pressure;

absorbing the NOx-containing gas stream in water in an absorption apparatus at a second pressure that is higher than the first pressure; and bleaching nitric acid with bleach air as secondary air, wherein the bleaching is performed at an operating pressure that is closer to the first pressure than the second pressure;

wherein the secondary air is brought to the operating pressure of the bleaching with a separate secondary air compressor or a secondary air compressor stage, wherein the separate secondary air compressor or the secondary air compressor stage is independent of a compressor that brings the primary air to the first pressure of the ammonia oxidation reactor, wherein downstream of the bleaching, a gas mixture formed in the bleaching is brought to the second pressure with a bleach air compressor or a bleach air compressor stage at which second pressure the absorption of the NOx-containing gas stream in water occurs, wherein the bleach air compressor or the bleach air compressor stage operates independently of an NOx compressor that compresses a product gas mixture of the ammonia oxidation reactor to the second pressure.

2. The process of claim 1 wherein an output stream of a low-pressure bleaching apparatus, which is brought to the second pressure in the bleach air compressor or the bleach air compressor stage, at an entrance to the bleach air compressor or the bleach air compressor stage comprises a residual content of NOx (NO+NO$_2$) of 0-5000 ppmv.

3. The process of claim 1, further comprising monitoring an output stream of a low-pressure bleaching apparatus, which is brought to the second pressure in the bleach air compressor or the bleach air compressor stage, for a residual content of NOx (NO+NO$_2$) and/or of water and/or for parameters that depend on the residual content of NOx (NO+NO$_2$) and the water.

4. The process of claim 1 wherein an acid feed stream to a low-pressure bleaching apparatus includes means therein for adhering to a preferred residual content of NOx (NO+NO$_2$) at an entrance to the bleach air compressor or the bleach air compressor stage.

5. The process of claim 4 wherein the means for adhering to the preferred residual content of NOx (NO+NO$_2$) at the entrance to the bleach air compressor or the bleach air compressor stage includes an upstream bleaching tower that is operated at the second pressure level of the absorption apparatus and is supplied on a gas side with an output stream of the bleach air compressor or the bleach air compressor stage.

6. The process of claim 2 wherein the output stream of the low-pressure bleaching apparatus includes means for adhering to a preferred residual content of NOx (NO+NO$_2$) at the entrance to the bleach air compressor or the bleach air compressor stage.

7. The process of claim 6 wherein the means for adhering to the preferred residual content of NOx (NO+NO$_2$) is configured as a catalytic measure for a selective catalytic reduction of NOx with NH$_3$.

8. The process of claim 6 wherein the means for adhering to the preferred residual content of NOx (NO+NO$_2$) is configured as a dilution of the output stream of the low pressure bleaching apparatus with additional air that is provided from the bleach air compressor or from the bleach air compressor stage.

9. The process of claim 1 wherein the bleach air compressor or the bleach air compressor stage is operatively connected to the separate secondary air compressor or the secondary air compressor stage.

10. The process of claim 9 wherein the bleach air compressor or the bleach air compressor stage is coupled to the separate secondary air compressor or the secondary air compressor stage via transmission means.

11. The process of claim 1 wherein the secondary air, brought to the first pressure by the separate secondary air compressor or the secondary air compressor stage, is supplied to a bleaching apparatus operating at the first pressure via a separate conduit.

12. The process of claim 11 comprising supplying the gas mixture of NOx-laden bleach air exiting the bleaching apparatus to the bleach air compressor or the bleach air compressor stage via a conduit.

13. The process of claim 1 comprising passing the gas mixture that is brought to the second pressure and exits the bleach air compressor or the bleach air compressor stage into a region downstream of the NOx compressor via a conduit, with the gas mixture being subsequently supplied to the absorption apparatus.

14. A plant for producing nitric acid by the Ostwald process, comprising:

a primary air compressor;

a secondary air compressor disposed in a conduit tract separate from the primary air compressor such that the secondary air compressor is independent of the primary air compressor;

an ammonia oxidation reactor configured to react ammonia with atmospheric oxygen as primary air to afford a product gas mixture including a NOx-containing gas stream at a first pressure, wherein the primary air compressor is configured to bring the primary air to the first pressure;

an NOx compressor disposed on a same shaft as the primary air compressor, wherein the NOx compressor is configured to compress the NOx-containing gas stream to a second pressure that is higher than the first pressure;

an absorption apparatus configured to absorb the NOx-containing gas stream in water at the second pressure;

a bleaching apparatus configured to bleach nitric acid with bleach air as secondary air, wherein the bleaching is performed at an operating pressure that is closer to the first pressure than the second pressure, wherein the secondary air compressor is configured to bring the secondary air to the operating pressure; and a bleach air compressor or a bleach air compressor stage disposed downstream of the secondary air compressor and downstream of the bleaching apparatus, wherein the bleach air compressor or the bleach air compressor stage is configured to bring a laden gas stream from the bleaching apparatus to the second pressure at which absorption of an NOx-containing gas stream occurs in water, wherein the bleach air compressor or the bleach air compressor stage operates independently of the NOx compressor.

15. The plant of claim 14 wherein an exit of the secondary air compressor is connected via a conduit to a bleaching apparatus, wherein a conduit connects an exit of the bleaching apparatus to an entrance of the bleach air compressor or the bleach air compressor stage, wherein the bleach air compressor or the bleach air compressor stage is distinct from the NOx compressor.

16. The plant of claim 14 wherein a conduit that extends from a high-pressure side of the bleach air compressor or the bleach air compressor stage opens into a conduit in a high-pressure region downstream of the NOx compressor.

17. The plant of claim 14 wherein the secondary air compressor and the bleach air compressor are configured as two separate compressors coupled to one another via transmission means.

18. The plant of claim 14 wherein the secondary air compressor is configured as a first compressor stage of a compressor having at least two compressor stages and the bleach air compressor stage is configured as a second compressor stage of the same compressor, wherein the two compressor stages are coupled to one another via transmission means.

19. The plant of claim 14 wherein the secondary air compressor and the bleach air compressor or a secondary air compressor stage and the bleach air compressor stage are configured as transmission turbo compressors, wherein respective compressor shafts of the transmission turbo compressors or of respective compressor stages are coupled to one another via transmission means.

20. The plant of claim 14 wherein the primary air compressor and the NOx compressor are disposed on a same drive shaft while the secondary air compressor or a secondary air compressor stage and the bleach air compressor or the bleach air compressor stage are arranged in a drive train separate from the drive shaft.

21. The plant of claim 14 comprising a high-pressure acid condenser that is disposed downstream of the bleach air compressor or the bleach air compressor stage.

* * * * *